March 17, 1970 R. F. MENARY 3,501,760
FILM INSPECTING MACHINE
Filed April 14, 1966 2 Sheets-Sheet 1
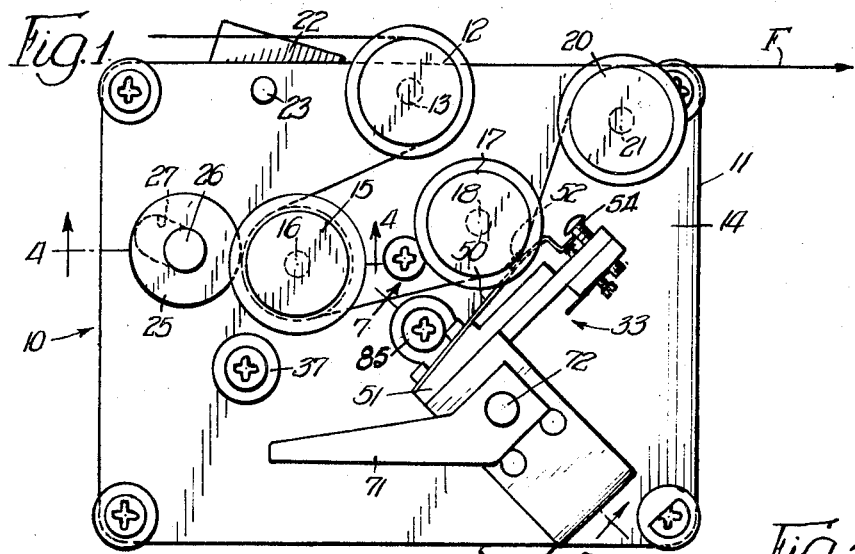
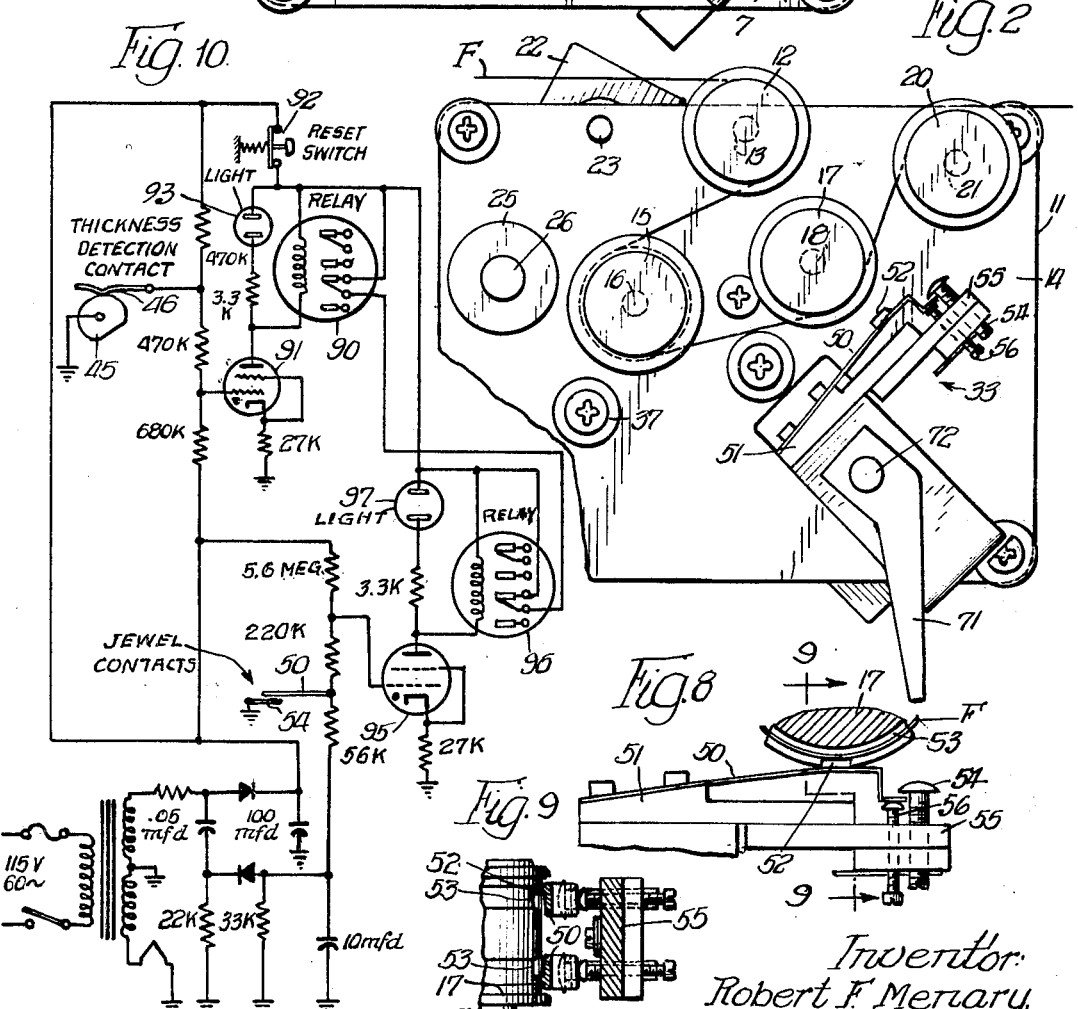
Inventor:
Robert F. Menary,
By Crist, Lockwood, Granawalt & Dewey
Attys March 17, 1970     R. F. MENARY     3,501,760
FILM INSPECTING MACHINE
Filed April 14, 1966     2 Sheets-Sheet 2
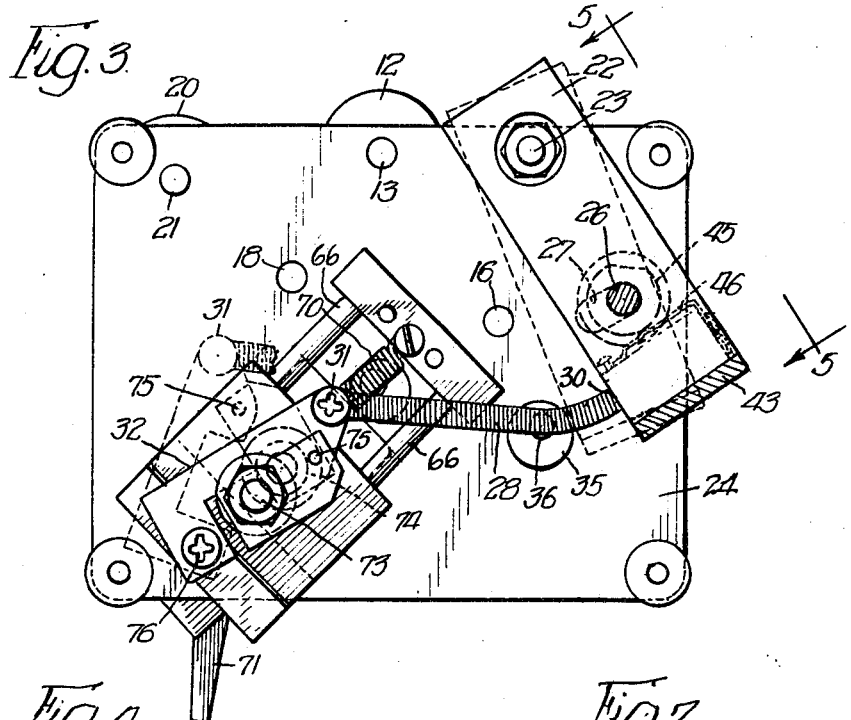
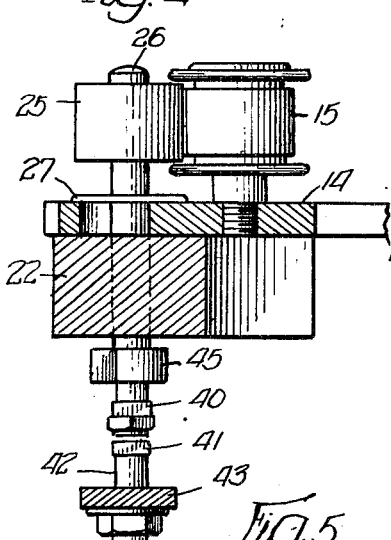
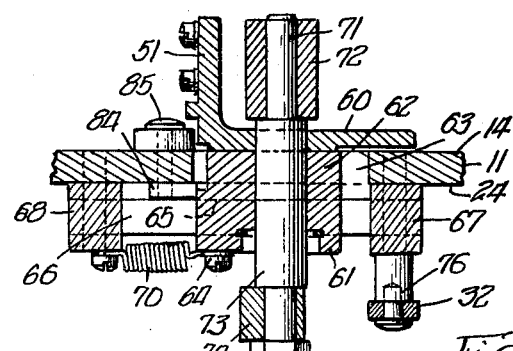
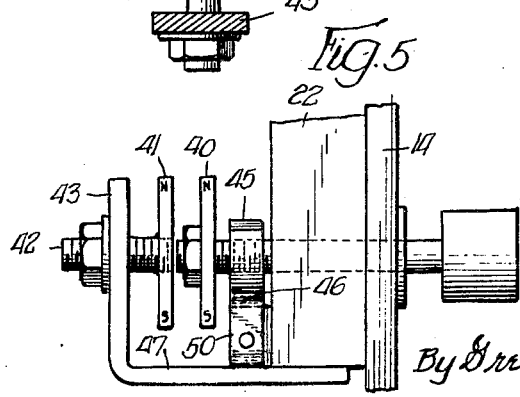
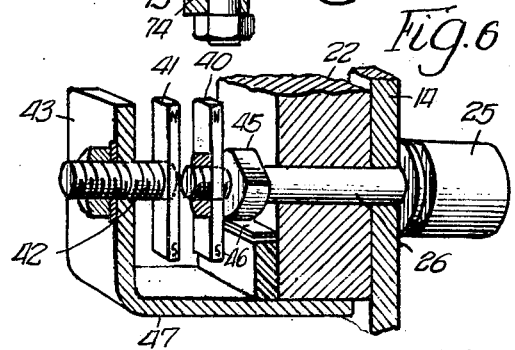
Inventor:
Robert F. Menary,
By Trust, Lockwood, Grunawalt + Dewey.
Attys.

United States Patent Office 3,501,760
Patented Mar. 17, 1970

3,501,760
FILM INSPECTING MACHINE
Robert F. Menary, Northbrook, Ill., assignor to Paulmar, Incorporated, Northfield, Ill., a corporation of Illinois
Filed Apr. 14, 1966, Ser. No. 542,484
Int. Cl. G08b *21/00*
U.S. Cl. 340—260
11 Claims

ABSTRACT OF THE DISCLOSURE

A machine for inspecting motion picture film to enable improper splices, sprocket hole tears and similar defects to be detected and appropriate repairs made which includes an inspecting head having rollers on which the film is transported past (1) a thickness sensing roller which operates a switch connected into the film drive circuit for stopping the drive when a section of film of more than normal thickness and exceeding a predetermined length engages the sensing roller and rotates the same, and (2) a tear detecting device which is in the form of film engaging jewels mounted on switch forming spring arms also connected into the drive circuit for stopping the drive when a jewel drops into a hole resulting from a break or tear in an unsupported portion of the film intermediate its marginal edges.

---

This invention relates to machines for inspecting strip material, for example, motion picture film and the like and is more particularly concerned with improvements in a machine for detecting variations in thickness due to splices, warped or burned spots, sprocket punches, and the addition of foreign material to the film, such as pieces of scotch tape or like materials and to breaks in the film due to torn sprocket holes and the like.

Motion picture film, because it is relatively fragile and easily damaged, is customarily inspected after each use, particularly, in the case of commercial film when it is returned by the exhibitor, so that any damage to the film, can be checked and appropriate repairs made before it is sent on to another exhibitor. Removal of defects such as improper splices, tears and the like is necessary in order to avoid damage to the film as it runs through the film projecting machine. Inspection of the film to detect objectionable defects can, of course, be accomplished manually by passing the film between the fingers of an inspector but this is such a time consuming and laborious operation that efforts have been made to develop satisfactory machinery for automatically detecting film defects including thickness variation due to improper splicing, sprocket tears and the like. Machines have heretofore been designed which automatically detect thickness variations and which are adjustable to pass splices of acceptable length and thickness while stopping the travel of the film when there are objectionable splices or other defects so as to enable the operator to remove the same by substitution of a proper splice. One such machine which is described in my Patent No. 3,180,143, granted Apr. 27, 1965, comprises a film feeding apparatus responsive to a defect detector through which the film runs and which is operated by film defects of a predetermined character to automatically stop the film feed in order for the operator to make appropriate repairs. While this machine has operated in a satisfactory manner it has some limitations particularly with respect to adjustability and sensitivity. Also, it has a somewhat involved electrical circuit which is required for operation and control of the machine. It is a principal object, therefore, of the present invention to provide an improved machine for inspecting film or the like which can be readily adjusted by the operator to allow defects of a predetermined character to pass through and to detect other defects which the operator desires to inspect and to stop the travel of the film or actuate a signal so that the operator can determine the need for and make the necessary repairs, and which involves a relatively simple electrical control circuit.

It is a more specific object of the invention to provide in a machine for inspecting film materials mechanism for detecting variations in thickness which may be adjusted so as to differentiate between permissible thickness variations, such as, a splice of predetermined length and thickness and non-acceptable variations or defects, such as, a splice of excessive thickness or excessive length, or the addition to the film of an undesirable length of scotch tape or similar material, or other defects, such as sprocket tears and the like.

It is another object of the invention to provide in a film inspecting machine mechanism which detects when a length of film has been increased in thickness a predetermined amount by improper splicing, the presence of foreign material on the film surface, such as a length of tape, or other thickness increasing defects.

It is still another object of the invention to provide a film inspecting machine having incorporated therein mechanism for sensing areas of increased thickness in the film which comprises a support for a rapidly traveling film and a rotatably mounted roller which is adapted to be spaced from the film support a distance approximately equal to the normal thickness of the film so that it is rotated by a film section having greater thickness than normal, a device associated with the roller which is actuated by rotation of the roller to control an electrical circuit for operating a signal and/or stopping the travel of the film in accordance with a predetermined degree of rotation of the roller.

It is a further object of the invention to provide a film inspecting machine which embodies a rotatably mounted roller which is spaced from the film support a distance sufficient to permit the passage of a traveling film of predetermined thickness and to be rotated by the passage of a film of greater thickness, a device associated with the roller for affording a degree of resistance to rotation thereof while permitting complete rotation of the roller without damage to the machine or the film and also causing the roller to return to or come to rest at a predetermined position when freed, and a switch for controlling an electric circuit for operating a signal or stopping the feed of the film which is actuated by a cam associated with the roller.

Another object of the invention is to provide a detector mechanism or defect sensing apparatus in a film inspecting machine which comprises a support for the film while it is advanced at a relatively high rate of speed, a rotatably mounted member spaced from the support a distance approximately equal to the normal thickness of the film so that it is rotated by a film section having greater thickness than normal, the amount of rotation depending upon the degree of thickness and/or the length of thickened section, a magnet arrangement associated with the rotatable member which is operative to afford a limited amount of resistance to the rotation thereof and which brings the rotatable member to a predetermined neutral position as soon as the thickened film section has passed, and the rotatable member is freed, an electrical circuit controlled by a switch which is operated upon predetermined rotation of the rotatable member and which is operative to actuate a signal and/or interrupt the drive for the film so as to stop the travel of the same.

It is a still further object of the invention to provide mechanism for measuring areas of increased thickness in a traveling film strip, which result from the addition of foreign material on the film or from splicing, through the rotation of a roller that is placed across the width of the film and spaced slightly away from the film so that it is not contacted by film of normal thickness and remains at rest while film of normal thickness passes it, the roller being spaced from the film so that it is rotated slightly by passage of a splice of acceptable length and thickness but is rotated a greater amount by passage of film having excessive thickness or length, and an associated electrical apparatus which is actuated upon a predetermined amount of rotation of the roller and provides an appropriate signal, stops the film or allows it to continue to run according to predetermined adjustment thereof.

It is another object of the invention to provide an apparatus of the type described wherein magnets are associated with the rotatable detecting roller so that they are adjustable to increase or decrease the resistance to rotation and also to change the location of the return or neutral position for the roller by adjusting the relative position of the poles.

It is still another object of the invention to provide in a film inspecting machine of the type described an improved device for detecting tears and other sprocket hole defects wherein a film contacting jewel is mounted on a resilient arm constituting a switch element in a film feed control circuit and a dampener is associated with the arm so as to prevent undesirable vibration of the jewel arm as the film passes through the mechanism, thereby increasing the sensitivity and enabling the device to detect very small and minor defects.

A further object of the invention is to provide in a machine of the type described an improved mounting arrangement for the detector elements which facilitates threading the film into the detector apparatus.

These and other objects and advantages of the invention will be apparent from a consideration of the machine which is shown by way of illustration in the accompanying drawings wherein:

FIGURE 1 is an elevation of a film defect detector mechanism embodying the invention which is adapted to be incorporated in a film inspecting machine;

FIGURE 2 is an elevation of the detector mechanism shown in FIGURE 1 with the detector elements in open position so as to facilitate threading the film through the mechanism;

FIGURE 3 is an elevation of the opposite face of the detector mechanism with the detector elements shown in the open position as in FIGURE 2, and with the closed position as in FIGURE 1 being indicated in dotted line;

FIGURE 4 is a section taken on the line 4—4 of FIGURE 1, to an enlarged scale;

FIGURE 5 is a fragmentary elevational view taken on the line 5—5 of FIGURE 3;

FIGURE 6 is a fragmentary perspective view of the film thickness sensing mechanism;

FIGURE 7 is a section taken on the line 7—7 of FIGURE 1, to an enlarged scale;

FIGURE 8 is a fragmentary elevational view of a portion of the mechanism shown in FIGURE 1, to a larger scale and with portions in section;

FIGURE 9 is a fragmentary section taken on the line 9—9 of FIGURE 8; and

FIGURE 10 is a view showing an electrical diagram illustrating a portion of the electrical circuit employed with the mechanism.

The invention is illustrated as adapted for incorporation in a machine for inspecting motion picture film. However, only those elements of the machine are illustrated which are necessary for an understanding of the invention. The inspecting machine will have provision for supporting the film reels and appropriate motor driven mechanism for advancing the film from a supply reel to a take-up reel, with the motor drive connected into an electrical control circuit. The machine will also have provision for counting the number of splices and other defects, if desired.

The defect sensing or detector mechanism 10 (FIGURES 1, 2 and 3) is mounted on a base plate 11, built in or attached to the inspection machine by bolts and screws or other fasteners. In the arrangement shown in the drawings the film F advances over a guide roller 12 mounted for free rotation on a shaft 13 extending from the front face 14 of the base plate 11 and located above a film support roller 5 which is mounted for free rotation on a supporting shaft 16 also extending from base plate 11. The film F engages a substantial portion of the periphery of the support roller 15 and advances from the lower portion of its path about the roller 15 to the bottom of the second support roller 17 which is mounted for free rotation on a supporting shaft 18 extending from the base plate 11. The film F then passes upwardly to a freely rotatable guide roller 20 on the shaft 21 which extends from the base plate 11 so that the film F travels in a path around the bottom portion of the support roller 17 and a top portion of the guide roller 20 and leaves the detector head 10 in a generally horizontal path.

The base plate 11, which is secured to the machine chassis in fixed relation has an elongate rectangular block forming roller supporting arm 22 (FIGURES 1 to 4) pivotally mounted at 23 on the rear face 24 of base plate 11. The pivoted arm 22 carries a roller 25 which has a surface of soft rubber, or other suitable material having similar characteristics. The roller 25 is mounted on a shaft 26 which is journaled in the free end of the arm 22 with the periphery of the roller 25 in oppositely disposed relation to the film supporting or film carrying peripheral portion of the film support roller 15. The roller support shaft 26 extends through an elongate slot 27 in the base plate 11 which limits the movement of the arm 22. In its normal position the roller 25 is disposed with its periphery spaced from the periphery of the roller 15 a distance which is only slightly greater than the normal thickness of the film F so as to permit free passage of a film of normal thickness without any movement of the roller 25. The arm 22 is resiliently held in this position by a coil spring 28 (FIGURE 3) having one end attached at 30 to the free end of the arm 22 and having its other end attached at 31 to the end of a swingably mounted L-shaped lever arm 32 which is mounted on a movable supporting mechanism for a device, indicated at 33 in FIGURE 1, for detecting film edge tears and similar defects, and which will be hereinafter described. A small disc 35 (FIGURES 1 and 3) is eccentrically mounted on the back face 24 of the plate 11 by means of a pin 36 which extends through the plate 11 and has a screw head 37 accessible for adjustment on the front face 14 of the base plate 11. The eccentrically mounted disc 35 is in the path of the free end of the roller carrying arm 22 and limits the movement of the roller 25 towards the roller 15 so as to permit adjustment of the space normally provided between the film confronting surfaces of the rollers 15 and 25.

The shaft 26 on which the roller 25 is mounted extends beyond the rear face of the supporting arm 22 and carries on its rear end a magnet 40 (FIGURES 4 to 6). A like magnet 41 is mounted on a supporting pin 42 which is adjustably threaded into an L-shaped bracket 43 on the roller supporting arm 22 with a lock nut on the threaded pin. The pin 42 is rotatable to move magnet 41 towards and from the magnet 40 and also to adjust the rotatable position of the same about an axis aligned with the axis of the shaft 26. The magnet 41, through magnetic attraction of its north and south poles at opposite ends thereof serves to normally hold the magnet 40 in parallel relation therewith and with the north and south poles thereof disposed opposite the opposite poles of the magnet 41. The magnet 40 is, however, free to turn about the axis of the shaft 26 to which it is attached, when a rotational force is applied to the roller 25 by passage of a section of film between the rollers 15 and 25 which has abnormal thickness due to an improper splice or the like. Since the position of the magnet 41 relative to the magnet 40 is adjustable the normal position of the magnet 40 relative to the axis of the shaft 26 may be varied and also the degree of force or resistance to turning due to attraction of the north and south poles may be varied by adjustment of the magnet 41 towards and from the magnet 40.

A switch forming plate cam 45 (FIGURES 3, 5 and 6) is secured on the shaft 26 which is normally engaged by spring contact arm 46 mounted on a portion 47 of the magnet support bracket 43. The switch arm 46 and plate cam 45 are connected into the control circuit for the machine as shown in FIGURE 10 and the switch is normally closed by engagement of the arm 46 with the cam edge 45. The cam 45 has a flat spot which, upon predetermined rotation of the roller 25 and shaft 26, will break the connection between the arm 46 and the cam 45. This results in interruption of the film travel as hereinafter described.

The device for detecting sprocket hole and film edge tears or similar damage to the film is associated with the film support roller 17 (FIGURES 1, 3, 7, 8 and 9). It comprises a pair of inspection arms 50 of spring material each mounted at one end on a supporting bed member 51 and carrying at the free end thereof an inspection jewel 52. In operative position, the jewels 52 ride on opposite side margins of the film, one over the sprocket track and the other over the sound track with the surface of the supporting roller 17 cut away at 53 (FIGURE 8) beneath the central portions of the film so that the film is supported only at its edges. A headed gap adjusting screw 54 is mounted on an insulating plate section 55 at the end of the support member 51 which is positioned when the jewel 52 is bearing against the film F so that there is a predetermined gap between the bent end portion of the inspection arm 50 and the head of the screw 54. The inspection arm 50 and the screw 54 form the two members of a make and break switch which is connected into the electrical control circuit for the machine. In the operative position with normal film the switch formed by these two members is open and it is closed only when there is a break or tear in the film allowing the arm 50 to flex with the jewel 52 moving toward the recess 53 in the roller 17. The screw 54 may be adjusted to vary the space between the end of the arm 50 and the screw head. A pin 56 is mounted in screw threaded adjustable relation in the end of the plate section 55 with the head thereof in oppositely disposed spaced relation to the inside face of the head of the adjusting screw 54. The pin 56 serves as a dampener to limit the vibratory movement of the arm 50. Otherwise, vibration, which may occur when the jewel 52 drops into a break in the film track area can result in improper functioning of the arm 51. The vibration dampener pin 56 enables the apparatus to be adjusted so that small defects which cause minor movement in the jewel arm will not slip by without being detected while at the same time premature or unwarranted contact between the arm and the screw 54, due to vibration of the arm, with resultant stopping of the machine when there is no defect, is avoided.

The jewel arms 50 are supported on the bed forming member 51 which is upstanding from a base forming slide member 60 which is secured on the top or forward surface of a slide block 61 having a portion 62 thereof slidable in a recess or slot 63 in the base plate 11 and a portion 64 provided with parallel bores 65 for mounting the same on a pair of spaced parallel guide rods 66 extending between two mounting blocks 67 and 68 extending from the back face 24 of the base plate 11. A tension spring 70 is connected at opposite ends to the slide block 64 and the mounting block 68 so as to normally pull the slide block and associated parts in a direction towards the film support roller 17 and engage the inspection jewels 52 with the film F. A manually operated handle forming lever 71 is secured at 72 on the upper end of a small shaft 73 which is journaled in the slide block 61 and carries at its bottom end a small rectangular arm forming block member 74 which has one end secured thereto. The other end of the small block 74 is bifurcated and pivotally connected at 75 adjacent the free end of the swinging L-shaped link member 32, the latter being mounted at the end of the short leg thereof by pivot 76 on the bottom face of the support block 67. The coil spring 28 which operates as a push-pull element is connected at 31 with the end of the link member 32, its other end being connected at 30 with the free end of the arm 22 on which the roller 25 is mounted. Rotation of the arm 71 about the pivot shaft 73 in a counter-clockwise direction, as viewed in FIGURE 1, rotates the small rectangular block 74 which in turn through its pivotal connection at 75 with the link member 32 swings the latter about the pivot 76 to the position shown in solid line in FIGURE 3. This moves slide block 61 on the guide bars 66 towards the support block 67 and shifts the inspection jewels 52 out of contact and away from the film F on the roller 17. This movement is against the action of the spring 70 and is limited in its extent by engagement of the side of the block 74 with the inner edge of the swinging arm 32. The movement of the pivot 31 causes the spring 28 to lose its tension and relieve the pull on the end of the arm 22, after which it acts as a pusher to swing the arm 22 about the pivot 23 to the open position as shown in FIGURES 2 and 3, thereby moving the roller 25 away from the film supporting roller 15 so that all of the rollers 13, 15, 17 and 20 are clear and accessible for threading the film over the same. An eccentrically mounted circular block 84 forming a stop member is mounted in the path of the slide block 61 for adjusting the innermost limit of movement or position of the slide block 61 and thus the pressure exerted on the film by the inspection jewels 52. The stop member has an operating head 85 on the outside face of the base plate 11 where it is accessible for operation by means of a suitable turning tool. The relationship of the pivot shaft 73 and the pivot points 76, 75 and 31 is such that the slide 61 and associated parts is held in both the open and closed positions against return movement upon turning the handle forming lever 71 to the limit of its movement in the desired direction while the block 61 is free to move between the two positions in response to rotation of the lever member 71.

An electrical circuit arrangement as disclosed in my Patent No. 3,180,143, with appropriate modifications, may be employed for feeding the film through the inspection machine and for controlling the movement thereof so as to respond to the defect detecting mechanism of the present invention. The switch elements 45 and 46 (FIGURE 10) which are associated with the thickness sensing roll 25 and which are normally closed are connected into the film drive circuit through relay 90 which is normally de-energized and which is operated by an electric valve 91. The valve 91 may be of the thyratron type, the characteristic of which is, once it is rendered conducting, it remains conducting so long as the circuit through the same is not interrupted, as by separation of the switch contacts 45 and 46. The electric valve 91 is normally non-conducting and is arranged to control the energization of relay 90, having an operating winding with one terminal connected through normally closed contacts of a reset switch 92 to the positive side of a bias supply. On energization the operating winding normally open relay contacts are closed to energize a signal light 93 and normally closed contacts which are connected to a motor control relay, such as relay 85 in FIGURE 5 of my Patent No. 3,180,143, are opened to interrupt the feed of the film until the reset switch 92 is operated. The jewel arms 50 and the co-operating contact screw elements 54 which constitute normally open switches are likewise connected into the circuit through an electric valve 95 which is normally non-conducting and which controls the normally de-energized relay 96, with a suitable signal light 97 for indicating defects detected by the jewels 52 and for interrupting the film travel. The valve members 91, 95 and relays 90, 96 take the place the valve member 78 and relay 79 in the control circuit of FIGURE 5 in Patent No. 3,180,143 and control the film drive mechanism through connection with the motor control relay. The valve members 91, 95 and relays 90, 96 may, of course, be replaced with equivalent electrical elements, for example, transistors may be substituted for the valve members 91, 95 and suitable solid state switching devices for the relays 90, 96.

I claim:

1. In an apparatus for inspecting film a supporting roller for a traveling film, a detector roller mounted for rotation on an axis which is parallel with the axis of the film supporting roller, said detector roller being spaced from said film supporting roller a distance slightly greater than the normal thickness of the film being inspected whereby said detector roller will be rotated by the passage of film of greater than normal thickness, means associated with the detector roller for returning said roller to a predetermined normal position when it has been rotated by passage of a film thickness greater than normal, a drive means and an electrical circuit for controlling said drive means, said circuit including a switch means associated with said detector roller which is operated upon predetermined rotation of said detector roller, said means for returning said roller to a predetermined normal position including a pair of magnets having the poles of one magnet disposed opposite the opposite poles of the other magnet when said detector roller is in said nomal position, one of said magnets being mounted for rotation with said detector roller and the other magnet of said pair being fixed so that the magnets act through magnetic attraction when the detector roller is free to hold said detector roller in said normal position.

2. In an apparatus for inspecting film as recited in claim 1, and said other magnet of said pair being adjustable relative to the axis of rotation of said one magnet and toward and from said one magnet whereby to permit adjustment of the normal position of said detector roller and to vary the magnetic force exerted by the magnets on each other.

3. In an apparatus for inspecting film, a support for a traveling film, a rotatably mounted detector roller having its peripheral surface spaced from said film support a distance slightly greater than the normal thickness of the film being inspected whereby said detector roller will be rotated by the passage of film of greater than normal thickness, magnetic means associated with the detector roller for normally holding said detector roller in a predetermined rotational position and for rotating said roller in a reverse direction so as to return said detector roller to said normal rotational position after it has been rotated by passage of a film thickness greater than normal, a drive means for the traveling film, an indicating means, and an electrical circuit for operating said drive means and actuating said indicating means, said circuit including a switch forming means which is operated upon rotation of said detector roller beyond a predetermined amount by passage of a film thickness greater than normal which exceeds a predetermined length so as to interrupt the drive means and stop the travel of the film.

4. In an apparatus for inspecting film as recited in claim 3, and said means for normally holding said detector roller in a predetermined position comprising co-operating magnets, one of which is normally in a fixed position and which is adjustable so as to vary the normal rotational position of said detector roller and/or the rotational force exerted on said detector roller.

5. In a film inspecting apparatus, a support for a traveling film, a detector roller, means mounting the detector roller for rotation adjacent said support with the peripheral surface of said detector roller spaced from said support a distance sufficient for film of predetermined thickness to pass freely between said roller surface and said film support while film of greater than said predetermined thickness will engage said roller surface so as to rotate said detector roller, the amount of rotation of said detector roller depending upon the length of film having greater than said predetermined thickness and/or on the thickness of said film in excess of said predetermined thickness, a magnet connected for rotation with said detector roller, and a co-operating stationary magnet mounted in oppositely disposed, spaced relation adjacent said roller mounted magnet and operative through magnetic attraction to rotate said detector roller and bring it to a predetermined rest position after it has been rotated by engagement with a film area of greater than normal thickness.

6. In a film inspecting apparatus as recited in claim 5, and said magnets being adjustable so as to vary the rest position of said detector roller.

7. In a film inspecting apparatus, a support for the traveling film having film edge engaging means with portions between said film edge engaging means recessed so that portions of the film intermediate the edges thereof are unsupported, a pair of flexible fingers having film engaging inspecting jewel members positioned in opposed relation to said recessed portions of said film support so as to bear resiliently on unsupported portions of the film, drive means for the film, an electrical circuit for controlling said film drive means, said fingers having associated electrical contact members with portions thereof overlying portions of the fingers adjacent said film support and co-operating therewith to constitute switch elements which are normally open and which close upon movement of the fingers due to breaks in the film and a vibrating dampening means mounted adjacent the contact members on the fingers to limit vibrating movement of the fingers resulting from unevenness caused by breaks in the portions of the film on which the film engaging members bear.

8. In a film inspecting apparatus as recited in claim 7, and said vibration dampening means comprising a stop member disposed in the vibrational path of each said resilient finger so as to limit the movement of said fingers.

9. In an apparatus for inspecting film as recited in claim 8, and said stop member being adjustable relative to said resilient finger so as to vary the extent of vibrational movement of said resilient finger.

10. In a film inspecting apparatus, a support for a traveling film, a film thickness sensing roller rotatably mounted on a support bracket which is mounted so as to enable the sensing roller to be moved between a closed position adjacent the film support and an open position spaced from said support bracket, a second support for the traveling film adjacent the first film support, a device associated with said second film support for sensing imperfections in the form of breaks or tears in the film, said device being secured on a carriage mounted for reciprocating sliding movement between a closed position when said device is adjacent said second film support and an open position is spaced relation to said second film support, an operating member rotatably mounted on said carriage, a linkage connected at one end thereof to said operating member and connected at the other end thereof to a fixed point so that upon turning said operating member said carriage is reciprocated by the linkage toward and from the film support, and a push-pull spring connecting said linkage and said sensing roller support bracket so that upon turning said operating member in one direction to move said carriage away from said film support said sensing roller support bracket is pushed to an open position away from the associated film support and upon turning said operating member in the opposite direction said sensing roller supporting bracket is pulled by said push-pull spring toward the associated film support to closed position.

11. In a film inspecting apparatus as recited in claim 10, and said linkage is arranged to releasably hold said film thickness sensing roller and said film imperfection sensing device in open position when said operating member is turned in said one direction and having means associated therewith for resiliently holding said roller and said device in closed position when said operating member is turned in said opposite direction.

References Cited
UNITED STATES PATENTS

| | | | |
|---|---|---|---|
| 601,780 | 4/1898 | Rowe | 242—57 X |
| 2,570,944 | 10/1951 | Hanser | 242—57 X |
| 2,713,158 | 7/1955 | Allen | 340—271 |
| 2,936,615 | 5/1960 | Braund | 73—157 |
| 3,255,533 | 6/1966 | Eichler | 33—148 |
| 1,190,204 | 7/1916 | St. James | 340—260 |
| 3,301,974 | 1/1967 | Hancock | 200—61.13 |
| 3,354,273 | 11/1967 | Bleiman | 200—61.41 |

JOHN W. CALDWELL, Primary Examiner

D. L. TRAFTON, Assistant Examiner

U.S. Cl. X.R.

33—147; 73—157; 340—259; 242—57